United States Patent
Baker (10) Patent No.: US 10,093,151 B2
(45) Date of Patent: Oct. 9, 2018

(54) METHOD AND APPARATUS FOR CONTROLLING A TEMPERATURE REGULATION SYSTEM

(71) Applicant: Jaguar Land Rover Limited, Whitley Coventry Warwickshire (GB)

(72) Inventor: Roger Baker, Solihull (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 552 days.

(21) Appl. No.: 14/425,032

(22) PCT Filed: Sep. 5, 2013

(86) PCT No.: PCT/EP2013/068409
§ 371 (c)(1),
(2) Date: Feb. 28, 2015

(87) PCT Pub. No.: WO2014/037467
PCT Pub. Date: Mar. 13, 2014

(65) Prior Publication Data
US 2015/0224851 A1    Aug. 13, 2015

(30) Foreign Application Priority Data

Sep. 6, 2012 (GB) .................................. 1215898.6

(51) Int. Cl.
*B60H 1/00* (2006.01)
*G05D 23/19* (2006.01)

(52) U.S. Cl.
CPC ..... *B60H 1/00807* (2013.01); *B60H 1/00792* (2013.01); *B60H 1/00878* (2013.01); *G05D 23/1931* (2013.01); *G01K 2201/02* (2013.01)

(58) Field of Classification Search
CPC .. B60H 1/00; B60H 1/00807; B60H 1/00878; B60H 1/00271; B60H 1/00357;
(Continued)

(56) References Cited

U.S. PATENT DOCUMENTS 5,259,814 A    11/1993  Weissbrich et al.
5,305,613 A *  4/1994  Hotta .................. B60H 1/00392
                                              180/65.1
(Continued)

FOREIGN PATENT DOCUMENTS

DE    4130063 A1    3/1993
EP    1894757 A1    3/2008
(Continued)

OTHER PUBLICATIONS

Japanese Notice of Reasons for Rejection, English summary only, corresponding to JP application No. 2015-530394, dated Mar. 8, 2016, 5 pages.
(Continued)

*Primary Examiner* — Keith Raymond
*Assistant Examiner* — Gustavo Hincapie Serna
(74) *Attorney, Agent, or Firm* — Reising Ethington P.C.

(57) ABSTRACT

A method for controlling a temperature regulated system within the cabin of a vehicle. The method comprises providing a first temperature sensor and a second temperature sensor, the temperature sensors being located within the cabin such that the first temperature sensor is located at a substantially higher level than the second temperature sensor when the vehicle is on a level surface. The method further comprises calculating TR, an estimated temperature, wherein TR is calculated using $T_1$, the temperature measured by the first temperature sensor and $T_2$, the temperature measured by the second temperature sensor. The method then comprises operating the temperature regulation system according to the calculated value TR for a predefined period of time after start up, and thereafter operating the temperature regulation system according to the measured value of $T_2$.

20 Claims, 4 Drawing Sheets (58) Field of Classification Search
CPC ............ B60H 1/00735; B60H 1/00778; B60H 1/00792; G01K 2201/00; G01K 2201/02; G05D 23/1931
USPC ....... 165/202, 204, 207, 211, 239, 253, 262, 165/267, 268; 62/132, 176.6, 239, 244; 236/44 C, 49.3, 91 R; 454/69, 75
See application file for complete search history.

(56) References Cited

U.S. PATENT DOCUMENTS

| | | | | |
|---|---|---|---|---|
| 5,325,912 | A * | 7/1994 | Hotta | B60H 1/00392 165/204 |
| 5,344,070 | A * | 9/1994 | Akasaka | B60H 1/00821 236/49.3 |
| 5,701,752 | A * | 12/1997 | Tsunokawa | B60H 1/00785 165/204 |
| 5,931,006 | A * | 8/1999 | Straub | B60H 1/00785 236/49.3 |
| 5,988,517 | A * | 11/1999 | Bauer | B60H 1/00864 165/217 |
| 6,712,133 | B1 * | 3/2004 | Kyrtsos | B60H 1/00735 165/239 |
| 6,772,834 | B2 * | 8/2004 | Iwamoto | B60H 1/00407 165/202 |
| 6,843,424 | B2 * | 1/2005 | Weber | B60H 1/00792 236/49.3 |
| 6,886,352 | B2 * | 5/2005 | Yoshinori | B60H 1/00642 165/202 |
| 7,197,927 | B2 * | 4/2007 | Stauss | G01N 25/66 73/335.02 |
| 7,281,971 | B2 * | 10/2007 | Tohda | B60H 1/00 237/12.3 B |
| 7,690,421 | B2 * | 4/2010 | Burns | B60H 1/00785 165/223 |
| 7,946,505 | B2 * | 5/2011 | Lynam | B60H 1/00785 165/202 |
| 8,011,597 | B2 * | 9/2011 | Phillippo | B60H 1/0075 236/91 C |
| 8,118,237 | B2 * | 2/2012 | Vyas | B60H 1/00428 236/46 C |
| 2001/0040321 | A1 * | 11/2001 | Reichel | B22D 43/001 266/45 |
| 2003/0039298 | A1 * | 2/2003 | Eriksson | B60H 1/00785 374/109 |
| 2010/0019050 | A1 | 1/2010 | Han et al. | |
| 2011/0082594 | A1 * | 4/2011 | Dage | B60H 1/00985 700/278 |

FOREIGN PATENT DOCUMENTS

| | | |
|---|---|---|
| FR | 2821659 A1 | 9/2002 |
| FR | 2913267 A1 | 9/2008 |
| JP | 56060713 | 5/1981 |
| JP | H0332919 A | 2/1991 |
| JP | 2002036847 A | 2/2002 |
| JP | 2005201577 A | 7/2005 |
| WO | 0130597 A1 | 5/2001 |

OTHER PUBLICATIONS

International Search Report for application No. PCT/EP2013/068409, dated Nov. 11, 2013, 4 pages.
UK Combined Search and Examination Report for corresponding application No. 1215898.6, dated Nov. 1, 2012, 8 pages.
Written Opinion for application No. PCT/EP2013/068409, dated Nov. 11, 2013, 5 pages.

* cited by examiner

Fig. 1

Prior Art

METHOD AND APPARATUS FOR CONTROLLING A TEMPERATURE REGULATION SYSTEM

FIELD OF THE INVENTION

This invention relates to methods for controlling temperature regulation systems within a vehicle. Aspects of the invention relate to an apparatus, to a control unit, to a system, to a method and to a vehicle.

BACKGROUND

HVAC (Heating, Ventilation and Air Conditioning) systems in modern cars rely upon information from sensors to maintain a pleasant environment in the car. In particular, the HVAC system must know the air temperature in the cabin of the car in order to determine whether to cool or heat that air for the users comfort. This information is typically provided by an In Car temperature Sensor (ICS).

Figure 1:
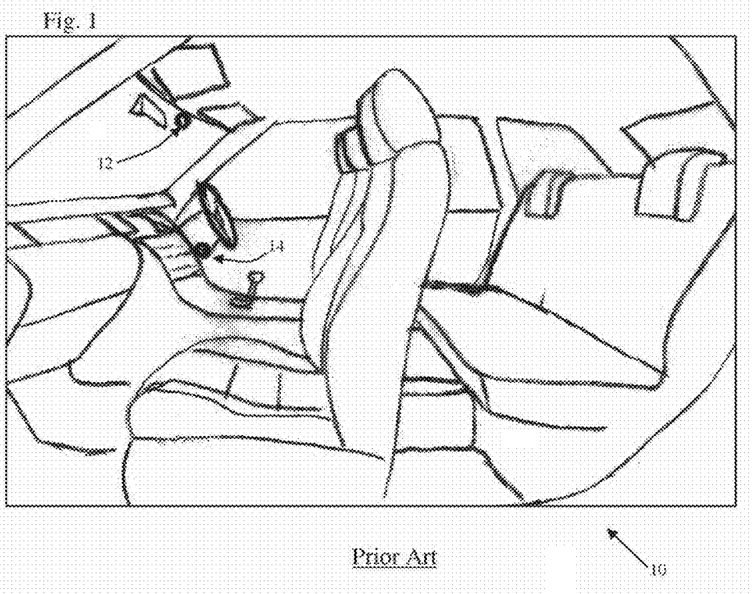
FIG. 1 is a photo of the inside of a car, indicating the typical locations of an Upper Cabin Sensor (UCS) and an In Car temperature Sensor (ICS)

FIG. 1 shows the location of an ICS 14 on a typical car 10. The ICS 14 is located on the lower part of the dashboard, where it is protected from direct sunlight which might cause the ICS 14 to give an incorrect reading of the ambient air temperature.

However, the ICS 14 only measures the temperature at a single point in the vehicle, while the air temperature can vary throughout the cabin. As a result, relying upon the ICS 14 when regulating the temperature of a cabin can lead to driver discomfort.

An improved system or method for controlling the temperature inside a vehicle is therefore desirable.

SUMMARY OF THE INVENTION

Aspects of the invention provide a control unit (e.g. a controller), a method and a vehicle as claimed in the appended claims.

In accordance with another embodiment of the present invention there is provided a control unit for use in controlling the temperature within the cabin of a vehicle. The control unit is arranged to receive a first temperature measurement $T_1$ from a first temperature sensor; and receive a second temperature measurement $T_2$ from a second temperature sensor. The first temperature sensor is located at a substantially higher level than the second temperature sensor when the vehicle is on a level surface. The control unit is further arranged to calculate a representative temperature, TR, wherein TR is calculated using $T_1$ and $T_2$; and operate a temperature regulation means according to the calculated value TR for a predefined period of time after start up, and thereafter operate the temperature regulation system according to the measured value of $T_2$.

In accordance with a further aspect of the present invention there is provided a temperature regulation system for use in controlling the temperature within the cabin of a vehicle. The temperature regulation system comprises at least one temperature regulation means; a first temperature sensor for measuring a first temperature, $T_1$; a second temperature sensor for measuring a second temperature, $T_2$; and a control unit arranged to receive measurements of $T_1$ and $T_2$ from the first and second temperature sensors. The temperature sensors are located within the cabin such that the first temperature sensor is located at a substantially higher level than the second temperature sensor when the vehicle is on a level surface. The control unit is arranged to calculate a representative temperature, TR, wherein TR is calculated using $T_1$ and $T_2$; and operate the temperature regulation means according to the calculated value TR for a predefined period of time after start up, and thereafter operate the temperature regulation system according to the measured value of $T_2$.

In accordance with a still further aspect of the present invention there is provided a method for controlling a temperature regulation system within the cabin of a vehicle. The method comprises providing a first temperature sensor and a second temperature sensor, the temperature sensors being located within the cabin of the vehicle such that first temperature sensor is located at a substantially higher level than the second temperature sensor when the vehicle is on a level surface, for example when the vehicle is being driven on a level surface. The method further comprises calculating TR, an estimated temperature of the cabin, wherein TR is calculated using $T_1$, the temperature measured by the first temperature sensor and $T_2$, the temperature measured by the second temperature sensor. The method then comprises operating the temperature regulation system according to the calculated value TR for a predefined period of time after start up, and thereafter operating the temperature regulation system according to the measured value of $T_2$.

In accordance with another embodiment of the present invention there is provided a control unit for use in controlling the temperature within the cabin of a vehicle. The control unit is arranged to: receive a first temperature measurement $T_1$ from a first temperature sensor; and receive a second temperature measurement $T_2$ from a second temperature sensor. The first temperature sensor is located at a substantially higher level than the second temperature sensor when the vehicle is on a level surface. The control unit is further arranged to: calculate a representative temperature, TR, wherein TR is calculated using $T_1$ and $T_2$; and operate a temperature regulation means according to the calculated value TR. The control unit may be further arranged to operate a temperature regulation means according to the calculated value TR for a predefined period of time after start up, and thereafter operate the temperature regulation system according to the measured value of $T_2$.

In accordance with a further aspect of the present invention there is provided a temperature regulation system for use in controlling the temperature within the cabin of a vehicle. The temperature regulation system comprises at least one temperature regulation means; a first temperature sensor for measuring a first temperature, $T_1$; a second temperature sensor for measuring a second temperature, $T_2$; and a control unit arranged to receive measurements of $T_1$ and $T_2$ from the first and second temperature sensors. The temperature sensors are located within the cabin such that the first temperature sensor is located at a substantially higher level than the second temperature sensor when the vehicle is on a level surface. The control unit is arranged to calculate a representative temperature, TR, wherein TR is calculated using $T_1$ and $T_2$; and operate the temperature regulation means according to the calculated value TR. The control unit may be further arranged to operate a temperature regulation means according to the calculated value TR for a predefined period of time after start up, and thereafter operate the temperature regulation system according to the measured value of $T_2$.

In accordance with a still further aspect of the present invention there is provided a method for controlling a temperature regulation system within the cabin of as vehicle. The method comprises prodding a first temperature sensor and a second temperature sensor, the temperature sensors being located within the cabin of the vehicle such that first temperature sensor is located at a substantially higher level than the second temperature sensor when the vehicle is on a level surface, for example when the vehicle is being driven on a level surface. The method further comprises calculating TR, an estimated temperature of the cabin, wherein TR is calculated using $T_1$, the temperature measured by the first temperature sensor and $T_2$, the temperature measured by the second temperature sensor. The method then comprises operating the temperature regulation system according to the calculated value TR. The control unit may be further arranged to operate a temperature regulation means according to the calculated value TR for a predefined period of time after start up, and thereafter operating the temperature regulation system according to the measured value of $T_2$.

In a conventional temperature control system which relies upon an ICS for temperature regulation, a short term temperature control failure can occur in vehicles fitted with automatic climate control systems. When the cabin temperature of a car has cooled due to low ambient temperatures, for example overnight, and the vehicle is then exposed to a high sun load, for example as the sun rises, this can create a condition wherein the upper cabin is warmer than the lower cabin. In this condition, the upper cabin may be comfortable or even too warm on entry, but the lower cabin, including the ICS, is still cold. In this scenario the system detects, via the ICS, that heating is required and this results in a thermal overshoot in the upper cabin that the ICS is blind to.

As the temperature at head height is often most important to the use a thermal overshoot in the upper cabin can cause the user considerable discomfort in the first few minutes after the car is started, until air circulation within the car acts to balance the temperature between the upper cabin and lower cabin. A system or method according to the invention, in contrast, provides a method for operating a temperature regulation system which can overcome misleading sensor readings at start up. If the upper area of the cabin is hotter than the lower area of the cabin, then this will result in a value of $T_1$ which is higher than that of $T_2$, since the first temperature sensor is in a higher location than the second temperature sensor. As $T_1$ is taken into account when calculating TR, the temperature regulation system then has a more realistic value from which to determine what airflow to provide within the cabin.

As the first sensor may give unreliable readings in the long term, for example due to exposure to the sun, the method according to the invention may then move to depending only upon the second sensor once a predefined time has passed.

Start up refers to the point at which the temperature regulation system begins to operate. This is typically upon ignition of the engine, but may be also be earlier, if for example the temperature regulation system is activated before the ignition in order that the vehicle is comfortable for the driver as rapidly as possible.

The temperature regulation system may be an HVAC (Heating, Ventilation and Air Conditioning) system.

The temperature regulation means may comprise blowers which are capable of directing air into the cabin, a heater, a refrigeration unit or any other suitable means for regulating the temperature of the cabin.

The temperature control system may further comprise additional sensors. Similarly, the method may further comprise providing additional sensors. The temperature control system may comprise additions first sensors, for use at and shortly after start up. The temperature contra system may comprise additional second sensors, for use throughout the operation of the temperature regulation system. Similarly, the method may comprise providing additional first sensors, for use at and shortly after start up. The method may comprise providing additional second sensors, for use throughout the operation of the temperature regulation system.

It may be that the first temperature sensor is located substantially at the expected head height of a driver who is sat within the car. This can be advantageous since it is the air temperature at head height that is often most important and immediately noticeable to a user. It may be that the first temperature sensor is attached to a windscreen of the vehicle. The first temperature sensor may have other uses. For example, the first temperature sensor may be an upper car temperature sensor for use in applications such as window demisting.

It is possible to use an existing temperature sensor, such as the air temperature sensor of a windscreen misting sensor attached to the windscreen of the vehicle, as the first temperature sensor. This can be advantageous, since it reduces the number of sensors which must be fitted, and in turn reduces the number of connections required between sensors and the control units in the vehicle. Over a production run of thousands of cars this can represent a substantial saving. This also means that the method according to the invention can be carried out in many existing vehicles without having to fit further sensors, since many vehicles already have both an in car sensor and a demisting sensor.

It may be that the second temperature sensor is located within the dashboard, it may be that the second temperature sensor is shielded from direct sunlight, for example by the dashboard.

It may be that TR is calculated using a weighted average of $T_1$ and $T_2$. This weighted average may be defined as: $(1-g) T_1 + (g) T_2$, where g is a tuneable-constant (of value between 0 and 1).

TR may be calculated using the values of $T_1$ and $T_2$ at start up. Alternatively, TR may be recalculated as $T_1$ and $T_2$ change after start up.

It may be that TR is calculated using a function which reduces with the time passed since start up. Furthermore, it may be that TR reduces exponentially with the time passed since start up. For example, TR may be given by the equation:

$$TR = (1-g)T_{1start} + g(T_{2start}) + ((1-g)T_{1start} + g(T_{2start}) - T_2)(e^{-t/\tau} - 1)$$

where $T_{1start}$ is the value of $T_1$ at start up, $T_{2start}$ is the value of $T_2$ at start up, t is the time which has passed since start up, and $\tau$ is a time constant.

Alternatively, TR may reduce linearly with the time passed since start up.

Where TR is calculated using a function which reduces with the time passed since start up, it may be that the method comprises operating the temperature regulation system according to the calculated value TR until $TR \leq T_2 + \delta$, where $\delta$ is a predefined constant, and operating the temperature regulation system according to the measured value of $T_2$ thereafter. $\delta$ may have a value or 0.5° C., $\delta$ may have a value of zero, or $\delta$ may be set at any other value depending upon the needs of the designer of the vehicle. The sensor inputs of the temperature sensors will have a software resolution (in the smallest increment that the software can handle based on the number of bytes it needs). Therefore it may be useful to ensure that the value of the tolerance (ie $\delta$) is set so that the tolerance is larger than the resolution.

It may be that the control unit is arranged to carry out the step of, or the method comprises, operating the temperature regulation system according to the measured value or $T_2$ at start up if the temperature regulation system was immediately previously deactivated for less than a predetermined period of time, for example less than one hour. It may be that the control unit is arranged to carry out the step of, or the method comprises, operating the temperature regulation system according to the measured value of $T_2$ at start up if the vehicle was immediately previously deactivated for less than a predetermined period of time, for example less than one hour. By deactivation is meant that the engine is stopped, the vehicle is stationary and the doors are locked. However, another definition might consist of only one or two of the engine being stopped, the vehicle being stationary, or its doors locked.

It may be that the control unit is arranged to carry out the step of, or the method comprises, operating the temperature regulation system according to the measured value of $T_2$ at start up if $T_1<T_2+h$, where h is a predetermined constant, for example 10° C.

It may be that a unit as described above is arranged to: receive a third temperature measurement $T_3$ from a third temperature sensor, wherein $T_3$ is a measurement of the temperature outside the vehicle; and operate the temperature regulation system according to the measured value of $T_2$ at start up only if $T_3$ outside a predetermined range, optionally if cooler than 5° C. or hotter than 30° C.

It may be that a system as described above further comprises a third temperature sensor, the control unit being arranged to receiver third temperature measurement $T_3$ from the third temperature sensor wherein $T_3$ is a measurement of the temperature outside the vehicle; and operate the temperature regulation system according to the measured value of $T_2$ at start up only if $T_3$ lies outside a predetermined range, optionally if cooler then 5° C. or hotter than 30° C.

It may be that a method as described above further comprises: providing a third temperature sensor; receiving a third temperature measurement T3 from the third temperature sensor, wherein T3 is a measurement of the temperature outside the vehicle; and operating the temperature regulation system according to the measured value of T2 at start up only if T3 lies outside a predetermined range, option wily it cooler than 5° C. or hotter than 30° C.

The invention further comprises a vehicle comprising a temperature regulation system as described above. Optionally, the control unit is part of an HVAC system or a cabin of the vehicle. Also optionally the first temperature sensor is an in Car temperature Sensor (ICS) and the second temperature sensor is an Upper Cabin temperature Sensor (UCS) of an automatic demisting unit controlled by the HVAC system and attached to a windscreen of the vehicle.

BRIEF DESCRIPTION OF THE DRAWINGS

Embodiments of the invention will now be described, by way of example only, with reference to the accompanying drawings, in which.

DETAILED DESCRIPTION

A special prescriptive routine can be devised and used to address the issue as follows:

As is illustrated in FIG. 1, a vehicle 10 has an Upper Cabin temperature Sensor (UCS) 12 and a lower cabin temperature sensor or In Car Sensor (ICS) 14. The UCS 12 is located in the interior and on the top of the windscreen. The UCS 12 is used as a misting sensor, and as such measures the temperature of the windscreen, the temperature of the air inside the cabin, and the humidity inside the cabin. From this data, the mist point inside the car can be calculated and, if required, a windscreen demisting routine can be invoked. The ICS 14 measures the air temperature inside the cabin, and is used in the regulation of the cabin temperature.

Therefore, the UCS 12 already measures the ambient air temperature in the upper cabin, and the ICS 14 measures the ambient air temperature in the lower cabin, both typically using an integral thermistor.

Figure 2:
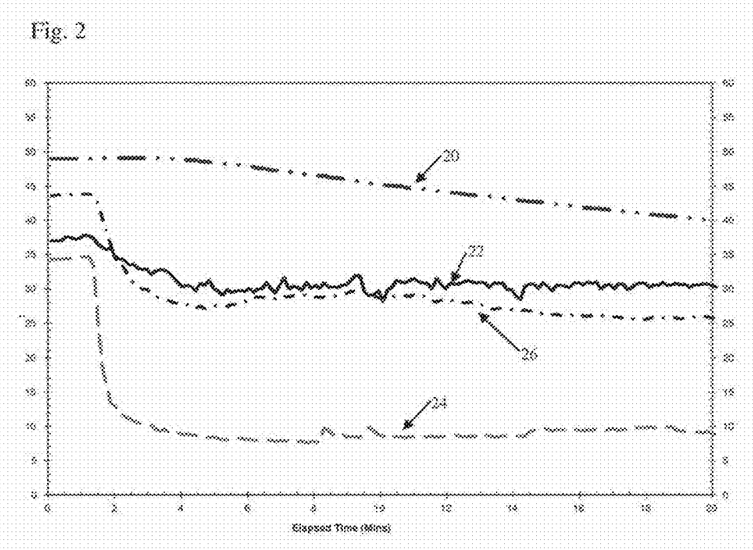
FIG. 2 is a graph showing the temperatures in a car as measured by different sensors immediately after start up after a short exposure to sunny climate.

FIG. 2 is a graph showing the temperatures in a car immediately after start up after a short exposure to a sunny climate. The line labelled 20 shows the temperature of the ambient air as measured by the UCS 12. The line labelled 22 shows the temperature of the ambient air as measured by the UCS 14. The line labelled 24 shows the temperature of the air provided by the vents directed towards the users face. Lastly, the line labelled 26 shows the temperature experienced by the user at head height, as recorded by a sensor specially provided for that purpose (for illustration only and not forming part of the present invention).

It can be seen in FIG. 2 that the temperature measured by the UCS 12 is considerably higher than the temperature measured by the ICS 14 at start up, i.e. at 0 min. It can also be seen that the temperature measured by the UCS 12 does not follow Head Temperature as the vehicle continues to move towards stabilization. This happens because the UCS 12 is still exposed to the sun, and as such will typically continue to indicate very high temperatures on a sunny day.

The comfort issue addressed here occurs when the upper cabin temperature is higher than the temperature of the air around the ICS 14. However simply replacing the measurements of the ICS 14 with the measurements of the UCS 12 will give rise to further problems with managing temperature within the cabin. In the example shown in FIG. 2, the temperature measured by the UCS 12 is significantly higher than the actual head temperature throughout the period of measurement. However the relationship between the head temperature and the temperature measured by the UCS 12 varies depending on factors such as the level of sunlight to which the vehicle is exposed and the ambient temperature. As a result, if the measurements from the UCS 12 were used to regulate the temperature in the cabin, the head temperature would vary in a way which would be uncomfortable for the driver.

Figure 3:
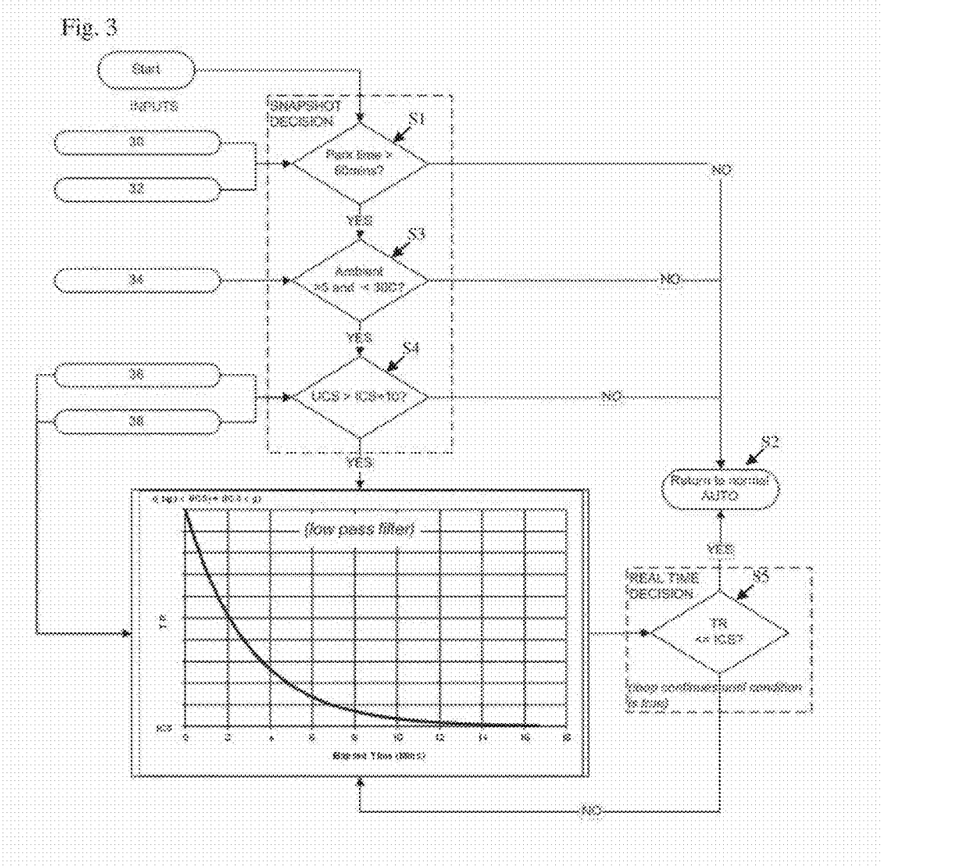
FIG. 3 is a flow diagram showing the operation of method according to an embodiment of the present invention.

FIG. 3 is a flow chart showing how an HVAC control system might operate at start up in an embodiment according to the invention. The HVAC control system has a number of inputs, including the current time 30, the time at which the ignition was last turned off 32, the ambient temperature 34 as measured by an exterior sensor, the lower cabin temperature 36 as measured by the ICS 14 and the upper cabin temperature 38 as measured by the UCS 12. In this embodiment, the HVAC control system first checks the length of the park time in step S1; the park time being how long it has been since the ignition (IGN) was turned off. If the park time is less than an hour, then, when engine ignition is started, the HVAC begins to operate in a normal mode at step S2. This check is performed because care is needed to avoid raise identification of the issue which is addressed by the invention after a short stop. During a short stop, convection currents can naturally drive a temperature inversion, but there will not be time for an imbalance of temperature to be developed which is significant to the user. Hence this check prevents the HVAC from entering a secondary mode if it has only been parked for a short time, for example during shopping or during picking up or dropping off of passengers.

Next, in step S3, the HVAC control system checks to see what the ambient temperature outside the car is. This is done using an exterior temperature sensor, which is often mounted in a wing mirror, if the temperature is not between 5° C. and 30° C., then the HVAC begins to operate in a normal mode at step S2. This check is performed since, if the ambient temperature is very high or very low, then the temperature imbalance which the invention seeks to address is unlikely to occur. That is, if the ambient temperature is less than 5° C., the head temperature of a user is unlikely to be substantial, however sunny the weather is, and if the ambient temperature is more than 30° C. the temperature measured by the ICS 14 is unlikely to be very different from the ambient temperature.

Next, at step S4, the HVAC control system checks to see if the measurement of the cabin air temperature provided by the UCS 12 is significantly different from the measurement of the cabin air temperature provided by the ICS 14. In the illustrated example, a significant difference is defined as 10° C. If there is not a significant difference then the HVAC begins to operate in a normal mode at step S2. Otherwise, the HVAC begins to operate in a secondary mode.

In the secondary mode, the HVAC control system takes the air temperatures as measured by the UCS 12 and the ICS 14 and uses these values to calculate a value TR. Firstly, the UCS 12 and the UCS 14 measurements are combined into a weighted average given by the equation:

$$TR_{start} = (1-g)UCS_{start} + (g)ICS_{start}$$

In this equation, $TR_{start}$ is the value of the weighted average at start up, $UCS_{start}$ is the temperature measured by the UCS 12 at start up, $ICS_{start}$ is the temperature measured by the ICS 14 at start up, and g is a tuneable constant. The best value for g will depend upon a number of factors, including the placement of the sensors, their exposure to sunlight, the shape of the vehicle and so on. As such, the best value for g will typically need to be verified experimentally for each design of vehicle in which the invention is used.

The value TR evolves with time since TR is related to $TR_{start}$, the weighted average at start up, by an exponential function which reduces with the time passed since start up. Therefore TR declines over time, as indicated in the graph shown in FIG. 3.

In this embodiment, TR is defined by the equation:

$$TR = TR_{start} + (TR_{start} - ICS_{start})e^{-t/\tau} - 1)$$

In this equation, t is the time which has passed since start up, and $\tau$ is a time constant. As with g, the best value for $\tau$ will depend on various factors, and as such the best value for $\tau$ will typically need to be verified experimentally for each design of vehicle in which the invention is used. In a further embodiment of the invention, $\tau$ may itself be variable, and depend on measured values such as the values of the temperatures measured by the UCS 12 and the ICS 14, the ambient air temperature, the light level and so on.

The HVAC control system uses TR, which is an intermediate temperature between the ICS 14 and UCS 12 readings to determine the behaviour of the HVAC. Hence if TR indicates that the air temperature at the user's head height is too high, the HVAC can provide a cooling jet of cold air, which will tend to make the car more comfortable for the user. If the temperature at the user's head height is determined to be acceptable, the HVAC will not attempt to reduce the temperature further.

Figure 4:
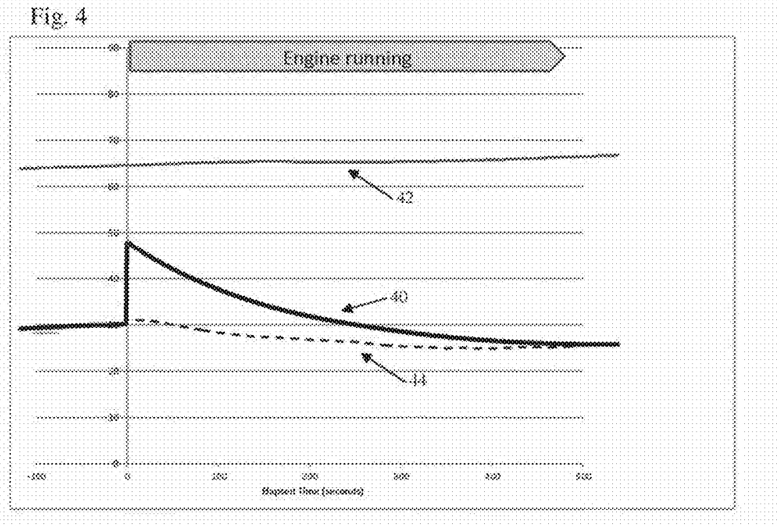
FIG. 4 is a graph showing example measured and calculated temperatures in a method according to an embodiment of the invention.

FIG. 4 shows example TR results for typical values measured by the UCS 12 and ICS 14. The value of TR as calculated is indicated by line 40, the value of the temperature measured by the UCS 12 is indicated by line 42 and the value of the temperature measured by the ICS 14 is indicated by line 44. The engine is started at zero seconds and over the course of the next five hundred seconds TR declines exponentially until it reaches the temperature measured by the ICS 14.

Returning to FIG. 3, the HVAC continues to operate in the secondary mode until TR is determined to be less than or equal to a threshold value at step S5. In the present embodiment, the threshold value is defined as the air temperature as measured by the ICS 14 plus 0.5° C. The HVAC then begins to operate in a normal mode. TR approaches $ICS_{start}$ as t approaches infinity. However, the air temperature as measured by the ICS 14 changes with time, and therefore the threshold value will change with time as well. As such TR is likely to reach the air temperature as measured by the ICS 14 in some finite time, and will also reach the threshold value within a shorter finite time.

The value of $\tau$ and the gap between the values measured the UCS 12 and ICS 14 determine how long the HVAC will operate in a secondary mode.

If the UCS 12 fails or is not present then the routine illustrated in FIG. 3 is not deployed, and the HVAC operates in normal mode throughout.

Therefore, in the embodiment above the temperatures measured at start up by the UCS 12 and the ICS 14 are used for a period of time after the system is turned on, but only if the vehicle has been parked for a given period of time.

Figure 5:
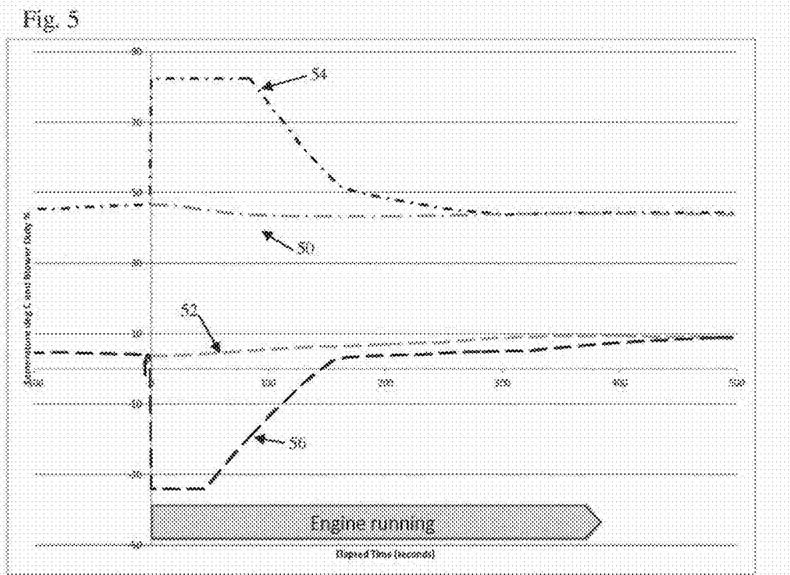
FIG. 5 is a graph illustrating the difference in blow activity in an HVAC operating in a normal mode or a secondary mode after start up.

FIG. 5 shows the target temperature and the amount of airflow provided by an HVAC operating in a normal mode and operating in a secondary mode after start up at time 0. The blower duty in the normal mode, which indicates the level of operation of the blower as a percentage of maximum capacity, is indicated by line 60. The target temperature of the air provided by the blower in the normal mode is indicated by line 52. The blower duty and the target temperatures of the blower in a secondary mode are indicated by lines 54 and 56 respectively. As can be seen, in the secondary mode, because the HVAC determines that the upper cabin is at a higher temperature than the lower cabin, the HVAC initially provides more air (i.e., higher duty %) and colder air in order to create a more pleasant environment for the driver and any other passengers during this period. The HVAC does not necessarily produce air at the target temperature, since the target temperature may be outside the temperature range which the HVAC is capable of producing. Where the target temperature gets beneath the temperature which the HVAC can produce, as in line 56, the HVAC is arranged to provide air at the lowest possible temperature, in this case 2° C.

Figure 6:
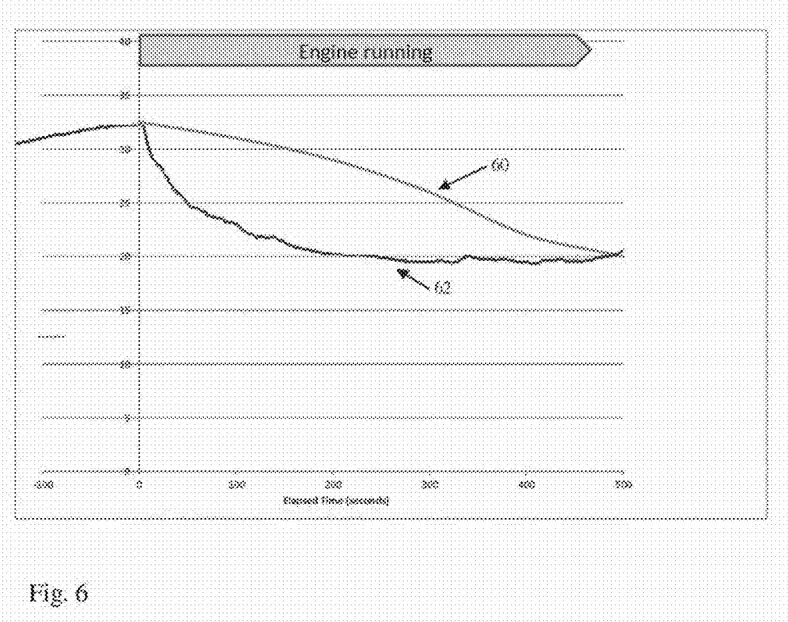
FIG. 6 is a graph illustrating the actual temperature at head height in a car in which the HVAC is operating in a normal mode (the original head temperature) or a secondary mode (the modified head temperature) after start up.

FIG. 6 shows the practical upshot of the difference illustrated in FIG. 5, by illustrating the actual temperature at head height in the car. The head temperature after start up at time 0 in the normal mode is indicated by the line 60. The head temperature in the secondary mode is indicated by the line 62. Because more and colder air is provided, the head temperature in the secondary mode drops faster than the head temperature in the normal mode, although the eventual temperature reached is the same.

In the embodiment above, an existing sensor, the UCS 12, is used in a novel way to manage a difficult comfort control issue. The limitations of the UCS 12 are also understood and avoided, since, as is discussed above, relying solely on the UCS 12 can lead to uncomfortable conditions for the driver.

However, embodiments of the invention may make use of sensors other than the UCS 12 and ICS 14, since any two temperature sensors within the cabin of the vehicle can be used to help regulate the temperature of that cabin according to the method described above.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A controller configured to control the temperature within the cabin of a vehicle, the controller being configured to:
   receive a first temperature measurement $T_1$ from a first temperature sensor;
   receive a second temperature measurement $T_2$ from a second temperature sensor,
   wherein the first temperature sensor is located at a higher level than the second temperature sensor when the vehicle is on a level surface; and
   receive an input indicative of time passed since start up;
   the controller being further configured to:
   calculate a representative temperature, $T_R$, wherein $T_R$ is calculated using $T_1$ and $T_2$; and operate a temperature regulator according to the calculated value $T_R$ for a predefined period of time after start up, and thereafter operate a temperature regulation system according to the measured value of $T_2$.

2. A temperature regulation system for use in controlling the temperature within the cabin of a vehicle, the temperature regulation system comprising:
   at least one temperature regulator;
   a first temperature sensor for measuring a first temperature, $T_1$;
   a second temperature sensor for measuring a second temperature, $T_2$; and
   a controller configured to receive measurements of $T_1$ and $T_2$ from the first and second temperature sensors,
   the temperature sensors being located within the cabin such that the first temperature sensor is located at a higher level than the second temperature sensor when the vehicle is on a level surface,
   the controller being configured to:
   receive an input indicative of time passed since start up;
   calculate a representative temperature, $T_R$, wherein $T_R$ is calculated using $T_1$ and $T_2$; and operate the temperature regulator according to the calculated value $T_R$ for a predefined period of time after start up, and thereafter operate the temperature regulation system according to the measured value of $T_2$.

3. A method for controlling a temperature regulation system within the cabin of a vehicle, the method comprising:
   providing a first temperature sensor for measuring a first temperature, $T_1$, and a second temperature sensor for measuring a second temperature, $T_2$, the temperature sensors being located within the cabin such that the first temperature sensor is located at a higher level than the second temperature sensor when the vehicle is on a level surface;
   calculating a representative temperature, $T_R$, wherein $T_R$ is calculated using $T_1$ and $T_2$; and
   operating the temperature regulation system according to the calculated value $T_R$ for a predefined period of time after start up, and thereafter operating the temperature regulation system according to the measured value of $T_2$.

4. The method according to claim 3, wherein the first temperature sensor is located at the expected head height of a driver who is seated within the car.

5. The method according to claim 3, wherein the first temperature sensor is attached to a windscreen of the vehicle.

6. The method according to claim 5, wherein the first temperature sensor is the cabin air temperature sensor of a windscreen misting sensor attached to the windscreen of the vehicle.

7. The method according to claim 3, wherein the second temperature sensor is located within a dashboard of the vehicle and/or is shielded from direct sunlight.

8. The method according to claim 3, wherein TR is calculated using a weighted average of $T_1$ and $T_2$.

9. The method according to claim 8, wherein the weighted average is:

$$(1-g)T_1 + (g)T_2$$

where g is a tuneable constant.

10. The method according to claim 3, wherein TR is calculated using a function which reduces with the time passed since start up.

11. The method according to claim 10 wherein TR reduces exponentially with the time passed since start up, and wherein $T_R$ is given by:

$$TR = (1-g)T_{1start} + g(T_{2start}) + ((1-g)T_{1start} + g(T_{2start}) - T_2)(e^{-t/\tau} - 1)$$

where $T_{1start}$ is the value of $T_1$ at start up, $T_{2start}$ is the value of $T_2$ at start up, t is the time which has passed since start up, and τ is a time constant.

12. The method according to claim 10 wherein the method comprises:
operating the temperature regulation system according to the calculated value TR until TR is less than $T_2+\delta$, where δ is a predefined constant, and operating the temperature regulation system according to the measured value of $T_2$ thereafter.

13. The method according to claim 3, wherein the method comprises:
operating the temperature regulation system according to the measured value of $T_2$ at start up if the temperature regulation system was immediately previously deactivated for less than a predetermined period of time.

14. The method according to claim 3, wherein the method comprises:
operating the temperature regulation system according to the measured value of $T_2$ at start up if:

$$T_1 < T_2 + h$$

where h is a predetermined constant, optionally 10° C.

15. The unit according to claim 1, wherein the controller is configured to:
receive a third temperature measurement $T_3$ from a third temperature sensor, wherein $T_3$ is a measurement of the temperature outside the vehicle; and
operate the temperature regulation system according to the measured value of $T_2$ at start up only if $T_3$ lies outside a predetermined range, optionally if cooler than 5° C. or hotter than 30° C.

16. The system according to claim 2, wherein the temperature regulation system further comprises a third temperature sensor, the control unit being arranged to:
receive a third temperature measurement $T_3$ from the third temperature sensor, wherein T3 is a measurement of the temperature outside the vehicle; and
operate the temperature regulation system according to the measured value of $T_2$ at start up only if $T_3$ lies outside a predetermined range, optionally if cooler than 5° C. or hotter than 30° C.

17. The method according to claim 3, wherein the method further comprises:
providing a third temperature sensor;
receiving a third temperature measurement $T_3$ from the third temperature sensor, wherein T3 is a measurement of the temperature outside the vehicle; and
operating the temperature regulation system according to the measured value of $T_2$ at start up only if $T_3$ lies outside a predetermined range, optionally if cooler than 5° C. or hotter than 30° C.

18. A vehicle comprising the temperature regulation system of claim 2.

19. A vehicle configured to carry out the method of claim 3.

20. The vehicle according to claim 18, wherein the control unit is part of an HVAC system of a cabin of the vehicle, and further optionally wherein the second temperature sensor is an In Car temperature Sensor and the first temperature sensor is an Upper Cabin temperature Sensor of a windscreen misting sensor controlled by the HVAC system and attached to a windscreen of the vehicle.

* * * * *